UNITED STATES PATENT OFFICE.

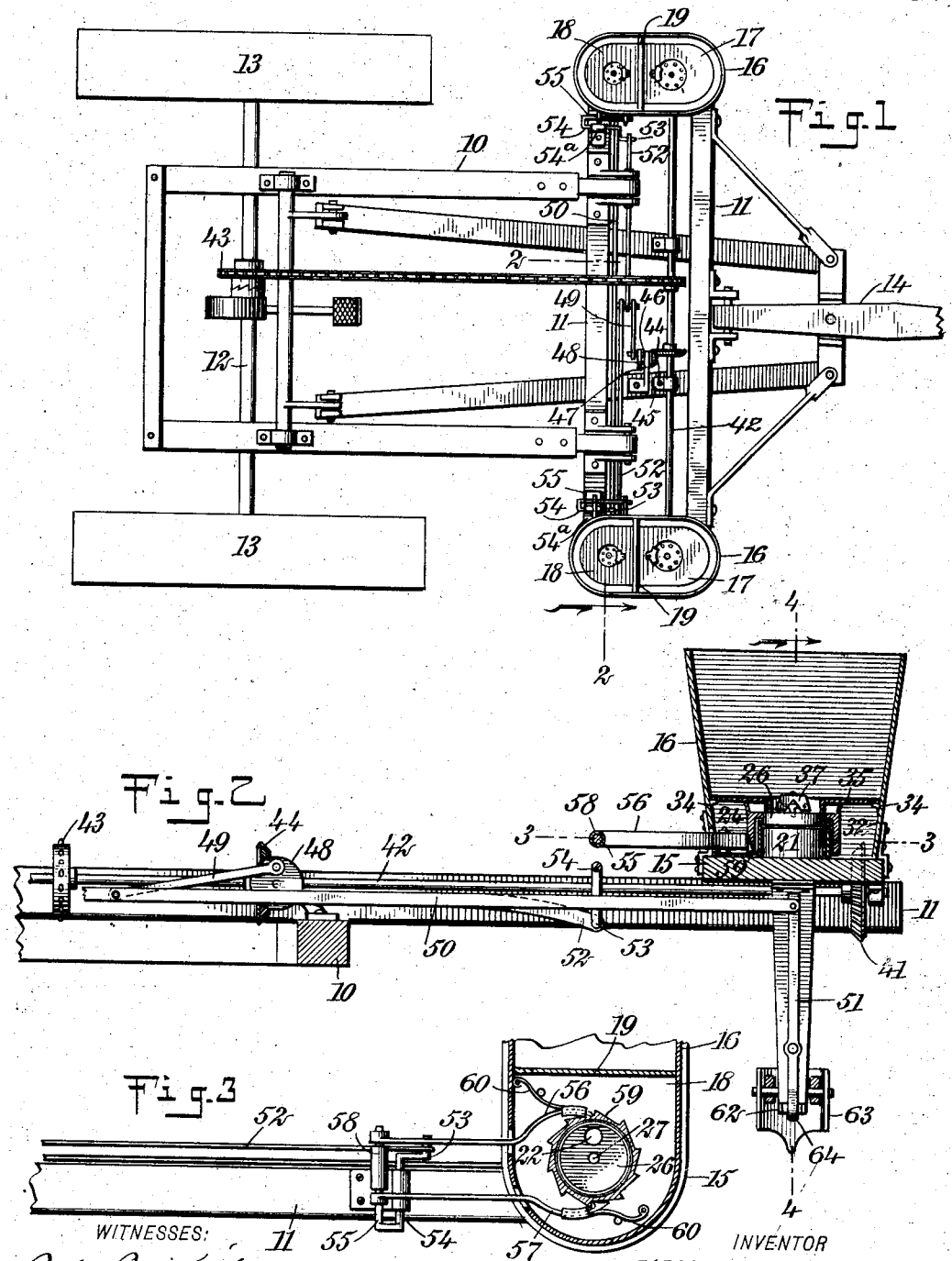

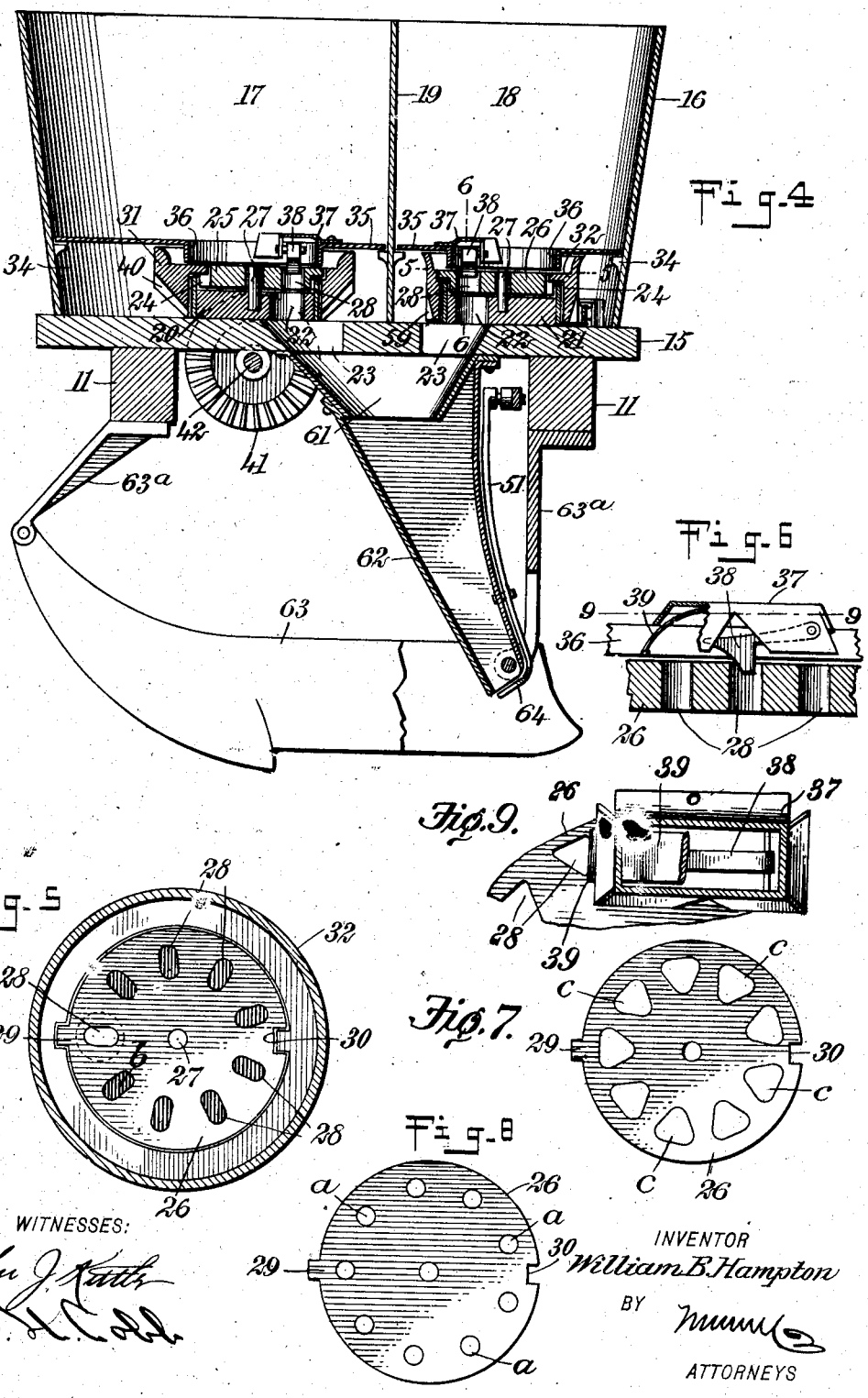

WILLIAM B. HAMPTON, OF PEGGY, MISSOURI.

PLANTER.

No. 835,066.     Specification of Letters Patent.     Patented Nov. 6, 1906.

Application filed December 4, 1905. Serial No. 290,140.

*To all whom it may concern:*

Be it known that I, WILLIAM B. HAMPTON, a citizen of the United States, and a resident of Peggy, in the county of Carter and State of Missouri, have invented a new and Improved Planter, of which the following is a full, clear, and exact description.

My invention relates to seed-sowing apparatus, and has for its principal objects the provision of means for simultaneously planting different kinds of seeds.

The invention consists in the various features and combinations hereinafter described and more particularly claimed.
Reference is to be had to the accompanying drawings, forming a part of this specification, in which similar characters of reference indicate corresponding parts in all the figures.

Figure 1 is a top plan view of one embodiment of my invention. Fig. 2 is an enlarged vertical sectional detail on the line 2 2 of Fig. 1. Fig. 3 is a horizontal sectional detail on the line 3 3 of Fig. 2. Fig. 4 is an enlarged transverse section on the line 4 4 of Fig. 2.
Fig. 5 is a horizontal sectional detail on the line 5 5 of Fig. 4. Fig. 6 is a section on the line 6 6 of Fig. 4, and Figs. 7 and 8 show in top plan other feed-plates than that illustrated in Fig. 5. Fig. 9 is a section on the line 9 9 of Fig. 6.

I have shown a frame 10, provided near its forward end with cross-bars 11. It is mounted upon an axle 12 and wheels 13 13 and has a suitable draft device 14. This portion of the apparatus need not be particularly described, it being arranged in a manner common in corn-planters. Supported near the outer extremities of the cross-bars are base-plates 15 15, upon each of which is mounted a hopper 16, divided into two receptacles 17 and 18 by a vertical partition 19. Reference being now had to but one of these hoppers, the receptacles may be of any relative size, that numbered 17 being here shown as larger. From the base within each of the receptacles rises a circular projection, these being designated by the numerals 20 and 21 in the receptacles 17 and 18, respectively. Through each projection is an opening 22, registering with an opening 23 in the base. About the outside of each projection and extending somewhat above it is an annular flange 24, and situated within these flanges and resting upon the projections are circular feed-plates 25 and 26, which may be further held against lateral displacement by spindles 27, extending upwardly from the projections at their centers. About each of the feed-plates is an annular series of openings 28, any one of which may be turned into registration with the opening in the associated projection. At the periphery of each feed-plate is a projection 29 and an opposite depression 30 for coöperation, respectively, with a depression and projection upon operating-rings 31 and 32, surrounding the projections 20 and 21 and being supported by the base-plate.

Carried by lugs 34, projecting into the hopper from its sides, are bottom plates 35, having openings from the edges of which flanges 36 depend within the operating-rings. Mounted at the edge of and above each of the bottom-plate openings is a housing 37, the lower edges of which extend into proximity with the upper surfaces of the feed-plates. Pivoted in each housing is a detent 38, provided with a projection which may engage each of the orifices in the seed-disk 28 during the rotation thereof for the purpose of ejecting the seed therefrom. In advance of the detent projecting from the under side of the housing close to the feed-plate is a deflecting-spring 39, which directs to one side the seeds striking it, thus causing only those which are within the openings 28 to be delivered to the registering opening.

Each operating-ring 31 has formed upon its periphery bevel-gear teeth 40, with which mesh pinions 41, fixed upon opposite ends of an operating-shaft 42, journaled in the frame beneath the base-plates of the hoppers. This operating-shaft is shown as rotated by the axle through sprocket-gearing 43. By this means when the planter is in motion each operating-ring, and therefore its feed-plate 25, is continuously rotated, causing the opening in the latter to deliver the seeds within the receptacle 17 of the hopper to the openings 22. The shaft 42 also has fixed to it a bevel-gear 44, coöperating with a bevel-pinion 45, fast upon a short shaft 46, journaled in a bracket 47, rising from the frame. At the opposite end of the shaft 46 from the pinion is secured a crank-disk 48, joined by a link 49 to an operating-bar 50, extending parallel to the cross-bars of the frame and being connected to levers 51, the mounting and function of which will be hereinafter described. Articulated to the operating-bar are links 52 52, which extend in opposite directions to crank portions 53 of rock-shafts 54, journaled in brackets 54ª adjacent to each of the hoppers. Each rock-shaft also has an upper crank portion 55, and pivoted upon each of these are pawls 56 57, separated by a sleeve 58. These pawls project upon opposite sides of ratchet-teeth 59, formed upon the ring 32, and coöperating therewith to alternately rotate the ring in one direction upon the opposite strokes of the rock-shafts. The pawls are shown as held in contact with the ratchet-teeth by leaf-springs 60, mounted upon the base-plates of the hoppers. This feed mechanism acts to intermittently bring the openings in each of the feed-plates 25 and 26 over the openings 22 in its base projection to deliver the seed thereto, as in the companion hopper-section.

The openings 23 in each base-plate are comparatively close to one another, and surrounding them is a funnel 61 common to both, which delivers to a chute 62, extending downwardly into proximity to the ground. The lower end of the chute lies between the divided end of an opening-share 63, which forms a furrow in which the seeds are to be dropped. Each of the shares may be carried by arms 63ª, projecting from the under sides of the cross-bars. The levers or valves 51 are fulcrumed upon the outsides of the chutes and have angular end portions 64 extending over the delivery ends thereof to serve as a cut-off or valve.

In growing some crops—for example, corn—it is advantageous to raise a cover-crop with it, this being preferably some such legume as cow-peas. When the peas are planted with the corn, they do not make rapid growth, and therefore do not interfere with the cultivation of the main crop; but after the corn is laid by the peas grow and during the dry season protect the ground from the sun, conserve the moisture, and prevent the growth of weeds. After the corn crop is harvested the peas can be either used for pasture or gathered and the tops and roots turned under to increase the supply of nitrogen. This operation of double planting is performed with great ease by my improved apparatus. The corn may be placed in the receptacle 17 and the peas in the receptacle 18, and as the planter is driven through the field both seeds are simultaneously delivered to the opposite chutes, thus sowing two rows with both kinds of seed. The reciprocation of the operating-bar which effects the rotation of the feed-plate 26 also oscillates the levers 51 across the end of the chutes, controlling their delivery. The proportion of the two seeds may be varied by providing a set of plates 26, in which are openings of different forms adapted to receive different numbers of the peas. In Fig. 8 a circular opening $a$ is illustrated, this receiving, say, a single seed. In Fig. 5 the opening $b$ is elongated and will take two seeds, while in Fig. 7 a triangular opening $c$ is shown, which will deliver three seeds.

It will be obvious that with my planter the labor of double sowing will be in no wise greater than in single sowing, and this result is secured without complication of the apparatus. It should be noted that all parts of the feeding mechanism are readily accessible without the removal of the hopper, since the bottom plates may be raised from their supporting-lugs and the operating-rings and feeding-plates separately withdrawn. If it is desired to use the apparatus for planting but one kind of seed, this may be effected by disconnecting the links actuating the feeding mechanism on the hopper-section 18.

Having thus described my invention, I claim as new and desire to secure by Letters Patent—

1. A pea-planter attachment for corn-planters, comprising a feed-plate, an operating-ring provided with ratchet-teeth encircling the feed-plate, a stud-shaft, a disk thereon provided with a wrist-pin, a link connected with the wrist-pin, a reciprocating bar actuated by the link, rock-shafts upon either side of the stud-shaft, a link connecting one arm of the rock-shafts with the reciprocating bar, pawls connected with the other arm of the rock-shafts and engaging the ratchet-teeth of the ring whereby to rotate the same, and means for rotating the stud-shaft.

2. A pea-planter attachment for corn-planters, comprising a feed-plate, an operating-ring for the feed-plate, a stud-shaft, a disk thereon provided with a wrist-pin, a link connected with the wrist-pin, a reciprocating bar actuated by the link, a rock-shaft at the side of the stud-shaft, a link connecting one arm of the rock-shaft with the reciprocating bar, means connected with the other arm of the rock-shaft for operating the feed-plate, and means for rotating the stud-shaft.

3. A pea-planter attachment for corn-planters, comprising a feeding device, a stud-shaft, a disk thereon provided with a wrist-pin, a link connected with the wrist-pin, a reciprocating bar actuated by the link, a rock-shaft at the side of the stud-shaft, a link connecting one arm of the rock-shaft with the reciprocating bar, means connected with the other arm of the rock-shaft for operating the feed-plate, and means for rotating the stud-shaft.

4. The combination with the corn-planter, of the pea-planter attachment therefor, and comprising a feed-plate, a stud-shaft, a disk thereon provided with a wrist-pin, a link connected with the wrist-pin, a reciprocating bar actuated by the link, a rock-shaft at the side of the stud-shaft, a link connecting one arm of the rock-shaft with the reciprocating bar, means connected with the other arm of the rock-shaft for operating the feed-plate, and means connected with the corn-planter for rotating the stud-shaft.

In testimony whereof I have signed my name to this specification in the presence of two subscribing witnesses.

WILLIAM B. HAMPTON.

Witnesses:
 IRA A. CARR,
 B. F. COLEMAN.